US008603702B2

(12) United States Patent
Kim et al.

(10) Patent No.: US 8,603,702 B2
(45) Date of Patent: Dec. 10, 2013

(54) ZINC AIR FUEL CELL WITH ENHANCED CELL PERFORMANCE

(75) Inventors: Hong Gon Kim, Seoul (KR); Dong Jin Suh, Seoul (KR); Chang Soo Kim, Daegu (KR); Hyun Joo Lee, Gyeonggi-do (KR); Byoung Koun Min, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 356 days.

(21) Appl. No.: 12/837,750

(22) Filed: Jul. 16, 2010

(65) Prior Publication Data
US 2011/0117456 A1   May 19, 2011

(30) Foreign Application Priority Data

Nov. 19, 2009 (KR) .................. 10-2009-0112074

(51) Int. Cl.
*H01M 8/04* (2006.01)
*H01M 4/42* (2006.01)

(52) U.S. Cl.
USPC ........... 429/515; 429/406; 429/501; 429/512; 429/513; 429/514

(58) Field of Classification Search
USPC .................. 429/406, 501, 512, 513, 514, 515
See application file for complete search history.

(56) References Cited

U.S. PATENT DOCUMENTS

| 3,021,776 | A | * | 2/1962 | Kennedy ...................... 454/57 |
| 3,981,747 | A | * | 9/1976 | Doniat et al. .................. 429/51 |
| 4,248,682 | A | * | 2/1981 | Lindstrom et al. ............ 204/242 |
| 4,438,185 | A | * | 3/1984 | Taskier ........................ 429/250 |
| 5,434,020 | A | * | 7/1995 | Cooper ......................... 429/210 |
| 6,127,061 | A |   | 10/2000 | Shun et al. |
| 6,153,328 | A |   | 11/2000 | Colborn |
| 2002/0098398 | A1 | * | 7/2002 | Chen .............................. 429/18 |
| 2003/0170519 | A1 | * | 9/2003 | Mittelstadt et al. ............ 429/30 |
| 2007/0298305 | A1 | * | 12/2007 | Van Burdine .................. 429/34 |
| 2008/0044640 | A1 |   | 2/2008 | Wang Chen |
| 2008/0166620 | A1 | * | 7/2008 | Fuller et al. .................... 429/34 |

FOREIGN PATENT DOCUMENTS

WO   02075827 A1   9/2002
WO   2007144357 A1   12/2007

OTHER PUBLICATIONS

Suwanwarangkul (Suwanwarangkul et al, Journal of Power Sources, vol. 161, Issue 1, Oct. 20, 2006, pp. 308-322).*
Lee, C.W. et al., "Novel alloys to improve the electrochemical behavior of zinc anodes for zinc/air battery," Journal of Power Sources 160 (2006), pp. 1436-1441.

(Continued)

*Primary Examiner* — Milton I Cano
*Assistant Examiner* — Jeremiah Smith
(74) *Attorney, Agent, or Firm* — Ladas & Parry LLP

(57) ABSTRACT

Provided is a zinc air fuel cell with enhanced cell performance which includes a separator-electrode assembly including a perforated metal plate as a cathode current collector, a catalyst-coated carbon paper, a separator, a perforated metal plate as an anode current collector, and a tilted nonconductive support. A metal plate may be placed on the tilted nonconductive support and connected to the anode current collector in the separator-electrode assembly to enlarge the active area of the anode current collector. Performance may be efficiently enhanced by minimizing a distance between the anode current collector and the cathode current collector, and by adding a metal plate which plays a role of an additional anode current collector on the tilted nonconductive support so as to increase the overall active area of anode current collector contacting with zinc pellets and to resultantly enhance the ionization of zinc.

17 Claims, 11 Drawing Sheets

(56) References Cited

OTHER PUBLICATIONS

Goldstein, J. et al., "Electric FuelTM Zinc-Air Battery Regeneration Technology," The 1995 Annual Meeting of the Applied Electrochemistry Division of the German Chemical Society, Suisburgn, Germany, Sep. 27-29, 1995 (8 pgs.).

Dewi, E. et al., "Cationic polysulfonium membrane as separator in zinc-air cell," Journal of Power Sources 115 (2003), pp. 149-152.

Harats, Y. et al., "The Electric FuelTM System Solution for an Electric Vehicle," Batterien and Batteriemnagement Conference, Essen, Germany, Feb. 22-23, 1995 (8 pgs.).

Mohamad, A.A., "Zn/gelled 6M KOH/O2 zinc-air battery," Journal of Power Sources 159 (2006), pp. 752-757.

Cherepy, N. et al., "A Zinc/Air Fuel Cell for Electric Vehicles," IEEE (1999), pp. 11-13.

Smedley, S. et al., "A regenerative zinc-air fuel cell," Journal of Power Sources 165 (2007), pp. 897-904.

Eom, S-W, et al., "The roles and electrochemical characterizations of activated carbon in zinc air battery cathodes," Electrochimica Acta 52 (2006), pp. 1592-1595.

Jiricny, V. et al., "Regeneration of zinc particles for zinc-air fuel cells in a spouted-bed electrode," Journal of Applied Electrochemistry 30: (2000), pp. 647-656.

Chao, W-K et al., "Clay as a dispersant in the catalyst layer for zinc-air fuel cells," Journal of Power Sources 177 (2008), pp. 637-642.

Wang, X. et al., "Studies on the oxygen reduction catalyst for zinc-air battery electrode," Journal of Power Sources 124 (2003), pp. 278-284.

\* cited by examiner

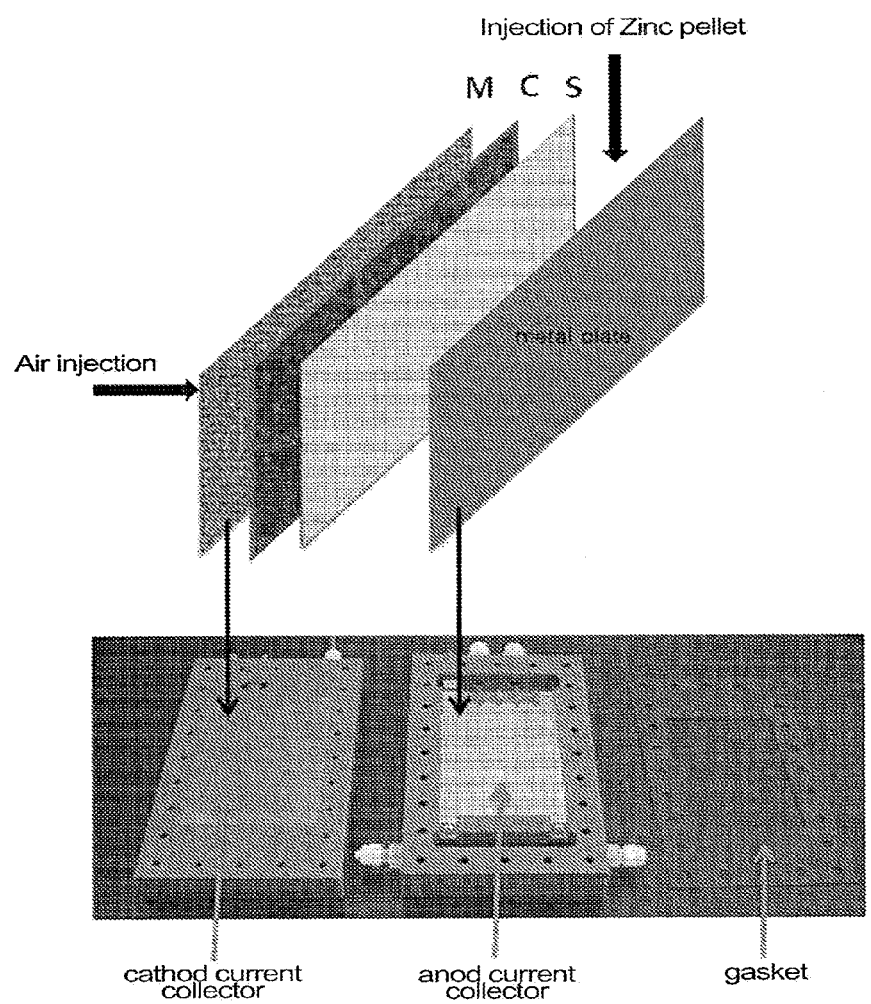

ZINC AIR FUEL CELL WITH ENHANCED CELL PERFORMANCE

CROSS-REFERENCES TO RELATED APPLICATION

This patent application claims the benefit of priority from Korean Patent Application No. 10-2009-0112074, filed on Nov. 19, 2009, the contents of which are incorporated herein by reference.

BACKGROUND OF THE INVENTION

1. Field of the Invention

The present disclosure relates to a zinc air fuel cell with enhanced cell performance.

2. Description of the Related Art

A zinc air fuel cell (ZAFC) is one of fuel cells which may replace internal combustion engines and lead acid batteries because the zinc air fuel cell can provide high energy efficiency as a next-generation cell with lightness and compactness. The zinc air fuel cell has several advantages that it produces stable discharge voltage, it maintains good performance and durability, it is environmentally friendly without producing harmful pollutants, it does not need fuel compression, and its manufacturing cost is low.

In operation of the zinc air fuel cell, zinc metals are provided as fuels, air is provided as an oxygen source, and aqueous alkaline solution is provided as an electrolyte. Zinc metals are ionized into zinc cations ($Zn^{2+}$) in aqueous alkaline solution to generate electrons, which are transferred to an anode current collector, and move to a cathode current collector through an outside circuit. Oxygen is supplied to the cathode side and reacts with $H_2O$ and electrons on the cathode catalysts forming hydroxyl ions ($OH^-$), and the hydroxyl ions move to the anode current collector through the electrolyte by concentration gradient. Then the hydroxyl ions react with zinc cations to form zinc oxides as the final product. According to this reaction scheme, the oxidation of zinc and the reduction of oxygen cause the change of chemical energy into electrical energy.

In the past, numerous studies on the zinc air fuel cell have been focused on the battery shape. Early studies proposed a zinc air fuel cell where a used zinc electrode was replaced with a new one, so that it was similar to a mechanically rechargeable secondary battery. Thereafter, studies have been performed on modified zinc air fuel cells which provide zinc pellets as the zinc fuel. Irrespective of cell-shapes, a few studies have been performed on the air cathode, especially on appropriate rare metal catalysts of cathode which may possess excellent oxygen reduction activities.

Hence, during investigation on zinc air fuel cells, the present inventors, to bring the present invention to completion, developed a zinc air fuel cell with enhanced cell performance by using a separator-electrode assembly, in which a cathode current collector, a catalyst-coated carbon paper, a separator, and an anode current collector are integrally combined, and also by using low-priced metal oxides as catalysts and low-priced NYLON™ (a generic designation for a family of polyamides trademarked by DuPont) filters as separators in the separator-electrode assembly.

SUMMARY OF THE INVENTION

One object of the present invention is to provide a zinc air fuel cell with enhanced cell performance.

In order to achieve the object, an embodiment of the present invention provides a zinc air fuel cell with enhanced cell performance that has an integrated separator-electrode assembly including a metal perforated plate as a cathode current collector, a catalyst-coated carbon paper, a separator, a metal perforated plate as an anode current collector and a tilted nonconductive support. In another embodiment, an additional metal plate may be provided as an anode current collector on a tilted nonconductive supporting wall, which faces the perforated anode plate in the separator-electrode assembly, in order to enlarge the area of anode surface contacting with zinc pellets.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a schematic diagram and a photograph illustrating a zinc air fuel cell of Comparative Example 1;

DESCRIPTION OF THE PREFERRED EMBODIMENTS

Figure 1:
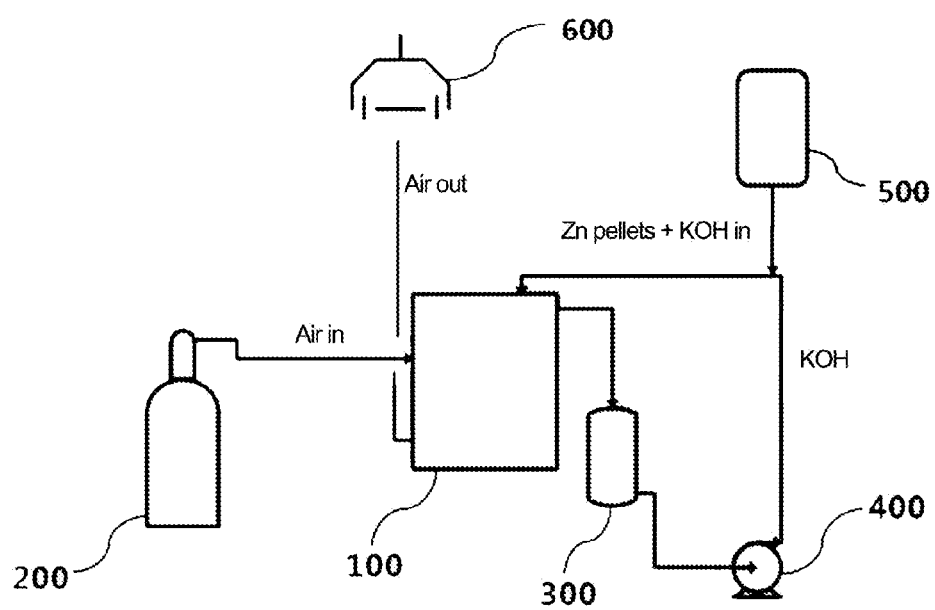
FIG. 1 is a schematic diagram illustrating an embodiment of a whole system of a zinc air fuel cell according to the present invention.

The present invention provides a zinc air fuel cell with enhanced cell performance, which includes a separator-electrode assembly including a metal perforated plate as a cathode current collector, a catalyst-coated carbon paper, a separator, a metal perforated plate as an anode current collector, and a tilted nonconductive support.

Hereinafter, a zinc air fuel cell according to the present invention will be described in detail.

Zinc metal is used as a fuel material of the zinc air fuel cell according to the present invention, air in the atmosphere is used as an oxygen source, and an aqueous alkaline solution is used as an electrolyte. When an electric circuit is connected, zinc reacts with the electrolyte to change into zinc ions ($Zn^{2+}$) generating electrons at the same time, electrons move to an anode current collector, and the electrons move through an outside path (wires) to a cathode current collector where hydroxyl ions are formed. At a cathode current collector of a metal perforated plate, hydroxyl ions are formed when electrons are provided to oxygen, which is supplied from outside, and water in the aqueous electrolyte. And then hydroxyl ions, which were generated at the cathode, move to the anode through the electrolyte to produce zinc oxides by reacting with zinc ions ($Zn^{2+}$). According to this reaction scheme, chemical energy changes into electrical energy, and the chemical reactions occurring at the cathode and the anode are shown in Reaction Formula 1.

Anode: $Zn+4OH^-=Zn(OH)_4^{2-}+2e^-(E_0=-1.25\ V)$
$Zn(OH)_4^{2-}=ZnO+2OH^-+H_2O$ Cathode: $O_2+2H_2O+4e^-=4OH^-(E_0=+0.40\ V)$ Overall reaction: $2Zn+O_2=2ZnO(E_0=-1.65\ V)$ [Reaction Formula 1]

Zinc, which is a fuel material for the zinc air fuel cell, is an anode material and may be used in a large pellet type with a particle diameter of about 5 mm or in a smaller sand (granular) type. Zinc emits electrons as zinc is ionized in an alkaline electrolyte, and emitted electrons are collected at the anode current collector. A surface of the zinc pellet is ionized in the alkaline electrolyte and reacts with hydroxyl ions, which are generated at the cathode, to generate zinc oxides, and zinc oxides are peeled off from the surface of the zinc pellet. As the surface of the zinc pellet where zinc oxides were released is further ionized, the zinc pellet reacts with hydroxyl ions to change into zinc oxides continuously, and the size of the zinc pellet decreases as the reactions proceed. For the series of reactions to occur, a cathode current collector and an anode current collector, which contact the electrolyte, must have high stability in aqueous alkaline solution and are preferred to have low electrical resistance.

The zinc air fuel cell is preferred to be composed of an integrated separator-electrode assembly including a metal perforated plate as a cathode current collector, a catalyst-coated carbon paper, a separator, and a metal perforated plate as an anode current collector.

A metal perforated plate used as the cathode current collector is preferred to use metals with excellent electrical conductivity such as stainless steel, nickel, iron, copper, gold or platinum, and is more preferred to use—stainless steel or nickel which is low-priced and has excellent corrosion resistance in aqueous alkaline solution preventing forming of a nonconductive layer on a surface thereof.

A carbon paper, on which catalyst materials are coated, is preferred to be prepared by mixing carbon particles, a catalyst substance and a binder in a weight ratio of 1.2 to 1.4:1.2 to 1.4:1 and by spraying the mixture on the carbon paper. For the catalyst substance, a mixture of $MnO_2$ and $CeO_2$ may be used, and for the binder, organic polymer solutions, especially NAFION™ (a generic designation for a family of a sulfonated tetrafluoroethylene based fluoropolymer-copolymers trademarked by DuPont) solution may be used. Since a mixture of metal oxides shows a certain activity on the reduction of oxygen, the mixture of $MnO_2$ and $CeO_2$ is applied for an effective catalyst material on the cathode. Amorphous carbon particles increase the active area of the cathode and also play a bridge role transferring electrons to the catalyst. Furthermore, NAFION™ (a generic designation for a family of a sulfonated tetrafluoroethylen based fluoropolymer-copolymers trademarked by DuPont) solution is used as a binding substance to form a catalyst layer on the carbon paper by binding the catalyst and conductive carbon particles.

The catalyst-coated carbon paper may also be manufactured as a multilayer structure by mixing amorphous carbon, a catalyst substance of a mixture of $MnO_2$ and $CeO_2$, and NAFION™ (a generic designation for a family of a sulfonated tetrafluoroethylene based fluoropolymer-copolymers trademarked by DuPont) solution as a binder in a weight ratio of 1.2 to 1.4:1.2 to 1.4:1, diluting the mixture with water and alcohol, spraying the diluted mixture on the carbon paper, drying the sprayed carbon paper, and repeating the spraying and the drying multiple times.

Furthermore, as materials for the separator, any microporous materials showing high stability in the alkaline electrolyte may be used, and a NYLON™ (a generic designation for a family of polyamides trademarked by DuPont) net filter is preferred. A main role of the separator is to prevent zinc pellets, the fuel material, from directly contacting the cathode current collector while it allows hydroxyl ions to move from the cathode to the anode through the electrolyte. That is, the separator allows zinc pellets to stay and be ionized in the alkaline electrolyte near the anode current collector rather than around the cathode current collector, while it allows hydroxyl ions ($OH^-$) to move from the cathode current collector to the anode current collector by the concentration gradient of hydroxyl ions.

Furthermore, for the metal perforated plate used as the anode current collector, it is preferred to use metals with high electrical conductivity such as stainless steel, nickel, iron, copper, gold and platinum. It is more preferred to use stainless steel or nickel, which is low-priced and on a surface of which the formation of a nonconductive layer is retarded due to its excellent corrosion resistance in aqueous alkaline solution.

Thus, the present invention may increase the electric generation efficiency per unit active area of the zinc air fuel cell by shortening a moving distance of hydroxyl ions ($OH^-$), which is induced by providing an integrated separator-electrode assembly including a metal perforated plate as a cathode current collector, a carbon paper coated with catalyst layers through which the gaseous oxygen can pass but the liquid electrolyte cannot pass, a separator through which hydroxyl ions can pass but the solid zinc cannot pass, and a metal perforated plate as an anode current collector.

In the zinc air fuel cell according to the present invention, the nonconductive support is preferred to be tilted at angle ranging from 2° to 4° with respect to the separator-electrode assembly. If the nonconductive support is tilted, zinc particles move automatically downward, and zinc particles which are larger than the lower end aperture between the separator-electrode assembly and the nonconductive support may remain in the cell and be continuously used as raw materials. Furthermore, the size of zinc particles decreases as the reaction proceeds, and zinc oxide (ZnO) powder produced during the reaction and unreacted zinc particles smaller than the lower end aperture of the cell may flow outwards. Thus, the reduction in performance of the zinc air fuel cell caused by zinc oxide powder remaining inside, which inhibits the transfer of hydroxyl ions and the exposure of bare zinc to the electrolyte, may be prevented.

Furthermore, a material for the fuel cell body including a tilted nonconductive support according to the present invention needs to be electrically nonconductive and durable in aqueous alkaline solution, and may be selected from one of engineering plastics with excellent mechanical strength such as acrylonitrile-styrene copolymer (AS resin), acrylonitrilebutadiene-styrene copolymer (ABS resin), polystyrene (PS resin), polypropylene (PP resin), high-density polyethylene (HDPE resin) and polyimide.

Furthermore, a metal sheet may be placed on the tilted nonconductive support and used as an additional anode current collector. For the metal sheet, it is preferred to use a highly electrically conductive metal such as stainless steel, nickel, iron, copper, gold or platinum, and is more preferred to use stainless steel or nickel which is low-priced and has excellent resistance to forming of a nonconductive layer on a surface thereof in aqueous alkaline solution.

At this point, the performance of a zinc air fuel cell is enhanced by connecting the metal sheet on the tilted nonconductive support and the anode current collector of the separator-electrode assembly through wires to thereby increase the overall active area which can contact with zinc pellets and to thereby enhance the ionization of zinc.

The zinc air fuel cell according to the present invention uses an aqueous alkaline solution as the electrolyte, and the alkaline electrolyte provides an appropriate condition for the ionization of zinc and plays a medium role in transferring hydroxyl ions ($OH^-$) from the cathode to the anode where zinc ions are generated. In order to enhance the performance of zinc air fuel cell, all of a process of ionizing zinc, a process of producing zinc hydroxides by the reaction between zinc ions and hydroxyl ions, and a process of resultantly producing zinc oxides should be performed rapidly, consecutively and continuously. Accordingly, hydroxyl ions produced from the cathode should rapidly move to the anode and therefore, the closer a distance between the cathode current collector and the anode current collector is, the more enhanced a performance of the zinc air fuel cell is. While the alkaline electrolyte circulates and air is forcedly provided by a blower or from a compressed cylinder, more electricity is generated. And then, zinc pellets which are provided from the upper portion of the cell gradually change into zinc oxides from the surface thereof as reactions proceed, and the produced zinc oxides are released from the zinc pellets as white powder.

As shown in FIG. 1, in the zinc air fuel cell (ZAFC) 100, air is flowed in from a compressed air cylinder 200, and the electrolyte (e.g., potassium hydroxide) including smaller zinc particles and zinc oxide powder, which are released from the zinc air fuel cell 100 after the reaction, passes through an electrolyte buffer tank 300 where the zinc oxide powder and the small zinc particles are eliminated by sedimentation, and the electrolyte is provided again by a pump 400. New zinc pellets are provided for the zinc air fuel cell 100 together with the electrolyte provided from a zinc pellet reservoir 500, and unreacted air from the zinc air fuel cell 100 is released to atmosphere through a fume hood 600.

Hereinafter, the present invention will be described in detail with reference to examples and experimental examples. However, the following examples and experimental examples are provided to illustrate the present invention, and the scope of the present invention is not limited thereto.

Example 1

A Zinc Air Fuel Cell 1

Figure 2:
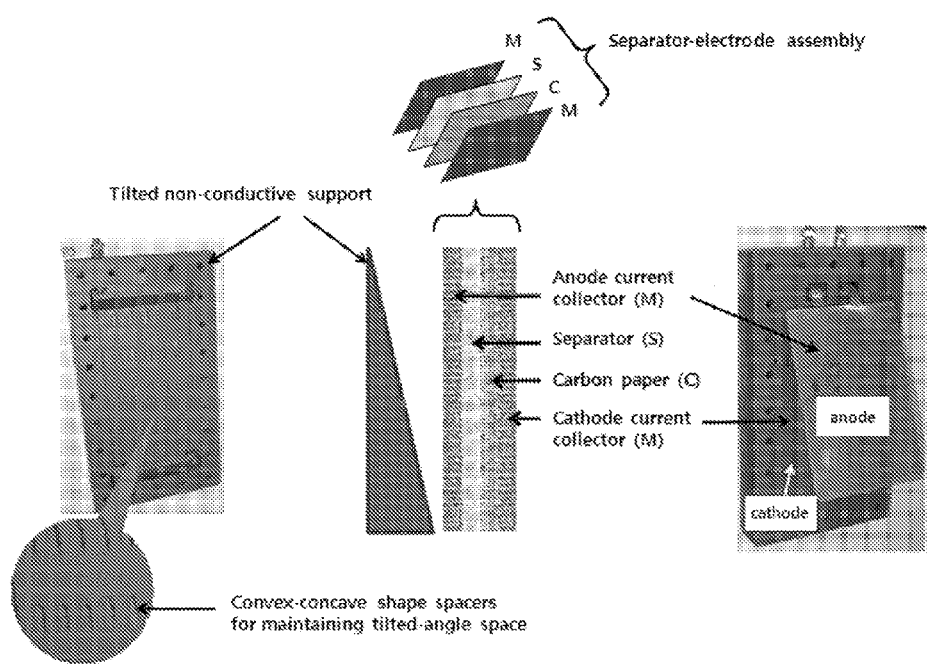
FIG. 2 is a photograph illustrating one embodiment of the zinc air fuel cell of Example 1 according to the present invention.

Thin stainless steel perforated plates were used as a cathode current collector and an anode current collector. A catalyst ink was sprayed on a carbon paper. As the catalyst ink, amorphous carbon and $MnO_2$ and $CeO_2$ (purchased from Johnson-Matthey) as catalyst substances were used. As a binding material, NAFION™ solution (NAFION™ polymer DE2021, purchased from DuPont) was used. Amorphous carbon, $MnO_2$ and $CeO_2$, and NAFION™ (a generic designation for a family of a sulfonated tetrafluoroethylene based fluoropolymer-copolymers trademarked by DuPont) solution were all mixed in a weight ratio of 1.3:1.3:1, and a sufficient amount of water and isopropyl alcohol were added thereto to make the catalyst ink. And then, the catalyst ink was sprayed on the carbon paper, which was dried at about 70° C. A catalyst layer on the carbon paper was manufactured as a multilayer structure by four-time repetitions of both spraying of a catalyst ink and drying. As a separator, a NYLON™ (a generic designation for a family of polyamides trademarked by DuPont) net filter (micro-porous polyimide hydrophobic filter with a pore size of 20 μm and a porosity of 14%; purchased from Milipore) was used. A separator-electrode assembly (SEA) was manufactured by sequentially stacking a cathode current collector of a stainless steel perforated plate, a catalyst-layer-coated carbon paper, a separator, and an anode current collector of a stainless steel perforated plate in an air-flowing direction. A zinc air fuel cell was manufactured by installing a nonconductive support which was 3° tilted with respect to the manufactured separator-electrode assembly and by using VITON™ (a generic brand of synthetic rubber and fluoropolymer elastomer trademarked by DuPont) fluoroelastomer (purchased from DuPont) for cell sealing (See FIG. 2).

Example 2

A Zinc Air Fuel Cell 2

Figure 3:
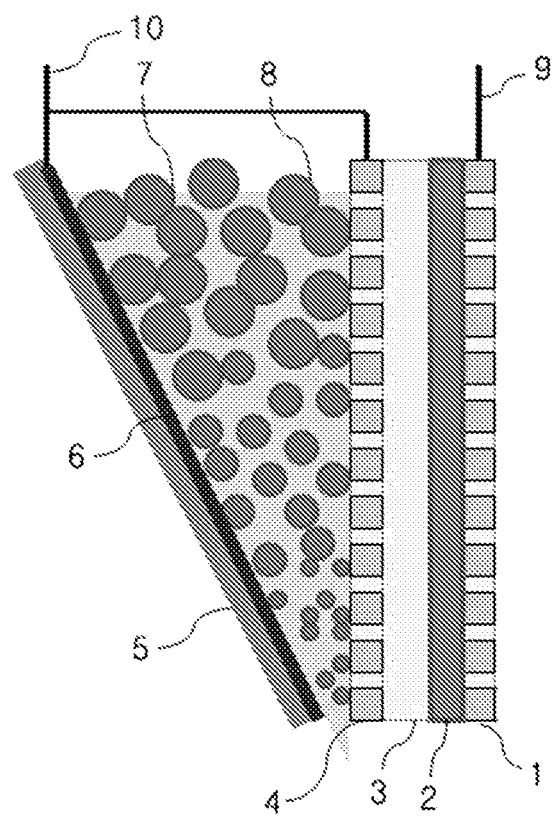
FIG. 3 is a schematic diagram illustrating one embodiment of the zinc air fuel cell of Example 2 according to the present invention.

A zinc air fuel cell was manufactured by the same method with Example 1 with exceptions that an additional metal sheet 6 was further installed on a tilted nonconductive support 5, and the metal sheet 6 and the anode current collector of perforated metal plate 4 were connected through wires 10. (See FIG. 3) A cathode current collector of perforated metal plate 1, a catalyst-layer-coated carbon paper 2, a separator 3 in FIG. 3 are the same as in FIG. 2. And, in FIG. 3, the same size of zinc pellets 7 and the same concentration of alkaline electrolyte 8 as in FIG. were used.

Comparative Example 1

A Zinc Air Fuel Cell 3

A plain stainless steel plate leaning on the tilted nonconductive support was used as an anode current collector, and a stainless steel perforated plate was used as a cathode current collector. A catalyst ink was sprayed on a carbon paper. As the catalyst ink, amorphous carbon and $MnO_2$ and $CeO_2$ (purchased from Johnson-Matthey) as catalyst substances were used. As a binding material, NAFION™ (a generic designation for a family of a sulfonated tetrafluoroethylene based fluoropolymer-copolymers trademarked by DuPont) solution (NAFION™ polymer DE2021, purchased from DuPont) was used. Amorphous carbon, $MnO_2$ and $CeO_2$, and NAFION™ (a generic designation for a family of a sulfonated tetrafluoroethylene based fluoropolymer-copolymers trademarked by DuPont) solution were all mixed in a weight ratio of 1.3:1.3:1, and a sufficient amount of water and isopropyl alcohol were added thereto to make the catalyst ink. And then, the catalyst ink was sprayed on the carbon paper, which was dried at about 70° C. A catalyst layer on the carbon paper was manufactured as a multilayer structure by four-time repetitions of both spraying of the catalyst ink and drying. As a separator, which was installed on the carbon paper, a nylon net filter (micro-porous polyimide hydrophobic filter with a pore size of 20 μm and a porosity of 14%; purchased from Milipore) was used. A zinc air fuel cell was manufactured by sequentially stacking a cathode current collector, a catalyst-layer-coated carbon paper and a separator, and by installing an anode current collector of a plain metal sheet on a nonconductive support which was 3° tilted with respect to the stacked assembly and by using VITON™ (a generic brand of synthetic rubber and fluoropolymer elastomer trademarked by DuPont) fluoroelastomer (purchased from DuPont) for cell sealing. (See FIG. 4)

Analysis

1. Electrochemical Responses According to the Structure of Zinc Air Fuel Cell

In order to investigate electrochemical responses according to the structure of zinc air fuel cell, a zinc air fuel cell where zinc pellets were introduced between an anode current collector (plain metal sheet) on a tilted nonconductive support and an assembly of separator-carbon paper with catalyst layers-cathode current collector (perforated metal plate) and another zinc air fuel cell where zinc pellets were introduced between a nonconductive support and an assembly of anode current collector (perforated metal plate)-separator-carbon paper with catalyst layers-cathode current collector (perforated metal plate) were represented by schematic diagrams and compared (See FIG. 5).

Figure 5A:
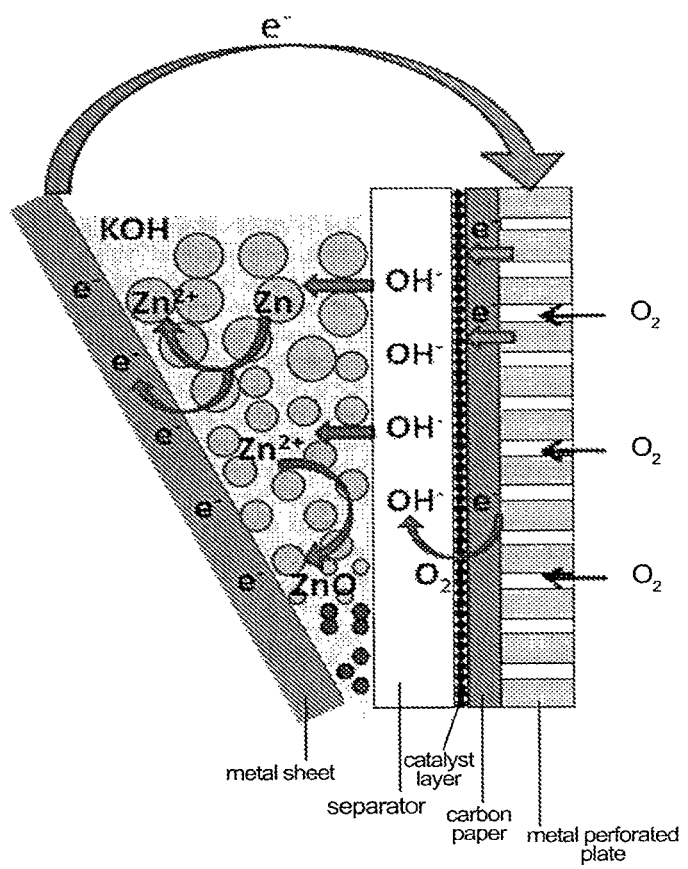
FIG. 5A is a schematic diagram illustrating an operating principle of the zinc air fuel cells as Comparative Example 1.
Figure 5B:
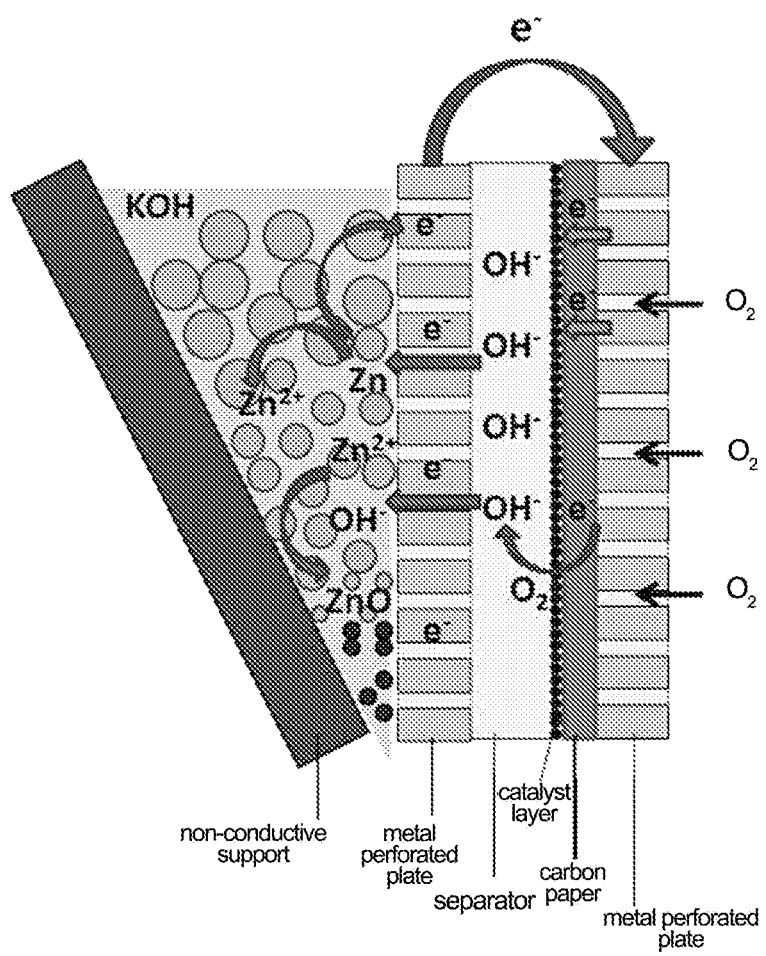
FIG. 5B is a schematic diagram illustrating an operating principle of the zinc air fuel cells as Example 1 according to the present invention.

As shown in FIG. 5, while in the zinc air fuel cell of the Comparative Example 1 (FIG. 4 and FIG. 5A), a moving distance of OH⁻ ions to adjacent $Zn^{2+}$ ions for forming zinc hydroxides is long, in the other zinc air fuel cell of the Example 1 (FIG. 2 and FIG. 5B), a moving distance of OH⁻ ions to adjacent $Zn^{2+}$ ions for forming zinc hydroxides is shorter than that of the Comparative Example 1.

2. Changes in Performance of a Zinc Air Fuel Cell According to Materials of the Anode Current Collector Performance of the zinc air fuel cell in Example 1 using stainless steel (SUS or STS) or nickel as a material of the anode current collector was investigate, and the results were shown in FIG. 6.

Figure 6:
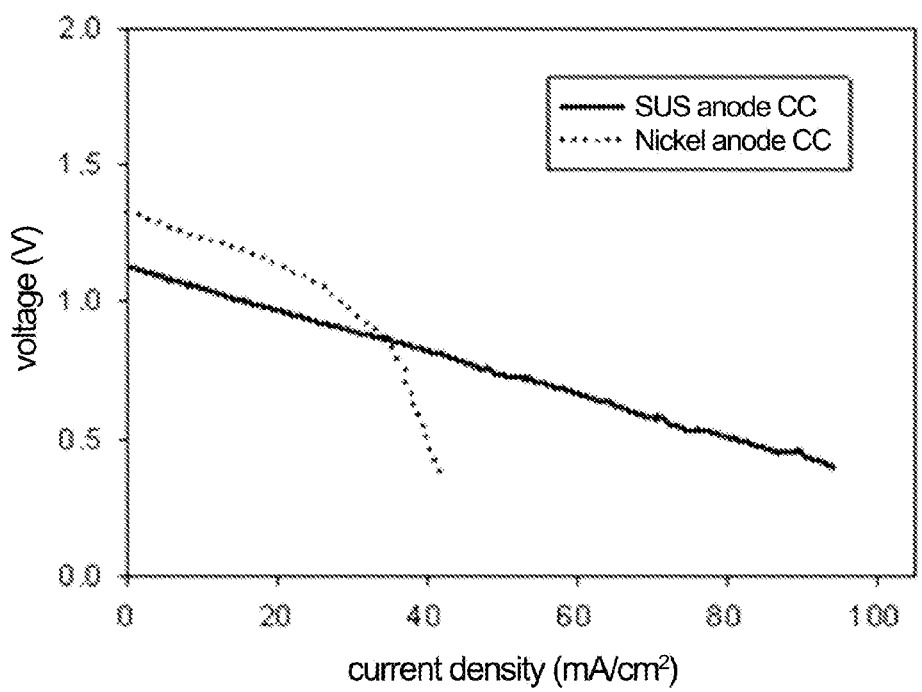
FIG. 6 is a graph illustrating a performance of the zinc air fuel cell according to an embodiment of the invention using stainless steel (SUS or STS) and nickel as a material for the anode current collector.

As shown in FIG. 6, when nickel was used for the current collector, it showed high stability in alkaline electrolyte, but an abrupt decrease in voltage with a current density of 20 $mA/cm^2$ or higher. In contrast, when stainless steel was used for the current collector, it showed high stability in an alkaline electrolyte, and a gradual decrease in voltage even with a high current density, which was comparable to a case where nickel was used for the current collector. Thus, the results showed that stainless steel is more proper than nickel for the anode current collector of a zinc air fuel cell from a point of high performance.

3. Changes in Performance of a Zinc Air Fuel Cell According to the Circulation Rate of Electrolyte Changes in performance of a zinc air fuel cell were analyzed according to the circulation rate of electrolyte in a zinc air fuel cell in Example 1 and the results were shown in FIG. 7.

Figure 7:
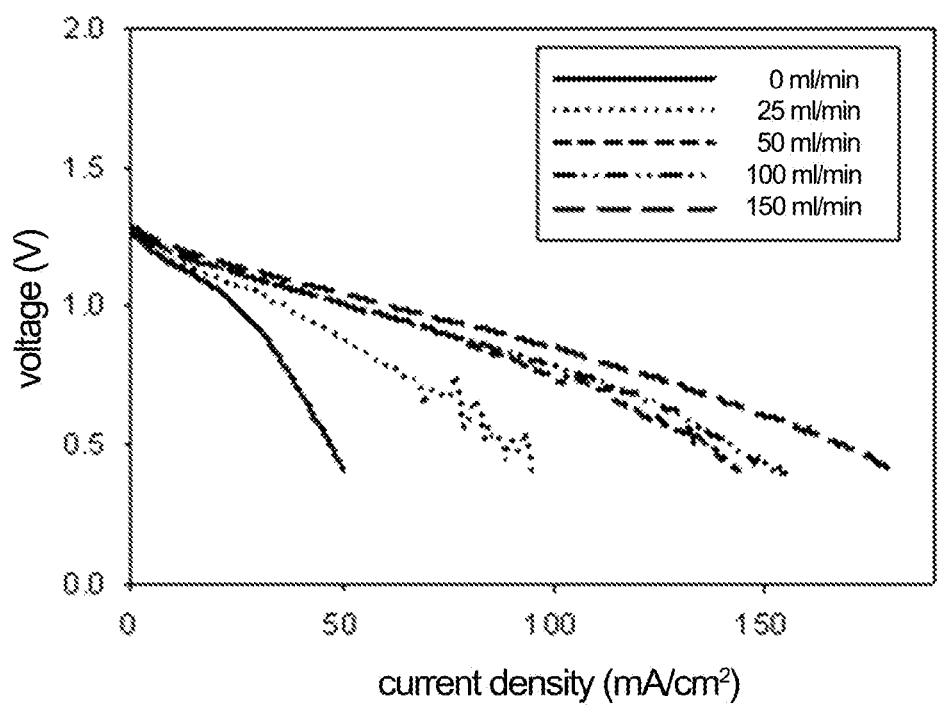
FIG. 7 is a graph illustrating a change in a performance of the zinc air fuel cell of Example 1 according to the circulation rate of electrolyte.

In a zinc air fuel cell, an alkaline electrolyte plays a key role in the ionization of zinc pellets and the transfer of hydroxyl ion. As shown in FIG. 7, it was clearly seen that the circulation of electrolyte remarkably enhanced the performance of the zinc air fuel cell comparing to that without electrolyte circulation. When the circulation rate of electrolyte was low, the performance of the cell was reduced. The higher the circulation rate of electrolyte was, the more enhanced the performance of the cell was. When the circulation rate of electrolyte was 150 ml/min, the highest rate used, the performance of the zinc air fuel cell was the highest. When the circulation rate of electrolyte was higher than 50 ml/min, the performance of the zinc air fuel cell did not show significant increase.

4. Changes in Performance of Zinc Air Fuel Cell According to the Catalyst Layers Each catalyst ink was manufactured with $MnO_2$, $CeO_2$ or a mixture of $MnO_2$ and $CeO_2$ as catalyst materials and was sprayed on a carbon paper. Various carbon papers with catalyst layers were manufactured while the preparation methods were varied. A zinc air fuel cell was manufactured by the same method with Example 1 to investigate the performance of the cell with various carbon papers, and the results were shown in FIG. 8.

The catalyst ink was manufactured by mixing $MnO_2$, $CeO_2$ or a mixture of $MnO_2$ and $CeO_2$ (a weight ratio of 1:1) with amorphous carbon and NAFION™ (a generic designation for a family of a sulfonated tetrafluoroethylene based fluoropolymer-copolymers trademarked by DuPont) solution in a weight ratio of 1:1.3:1.3, and by adding a sufficient amount of water and isopropyl alcohol. Each manufactured catalyst ink was sprayed on a carbon paper by air brush and dried at about 70° C. The spraying and the drying were repeated four times so as to minimize micro-cracks or holes on the catalyst layer which was formed as a multilayer structure. It was found that the permeability of electrolyte through a multilayer structure is lower than a single layer structure because of fewer defects in the multilayer.

Figure 8:
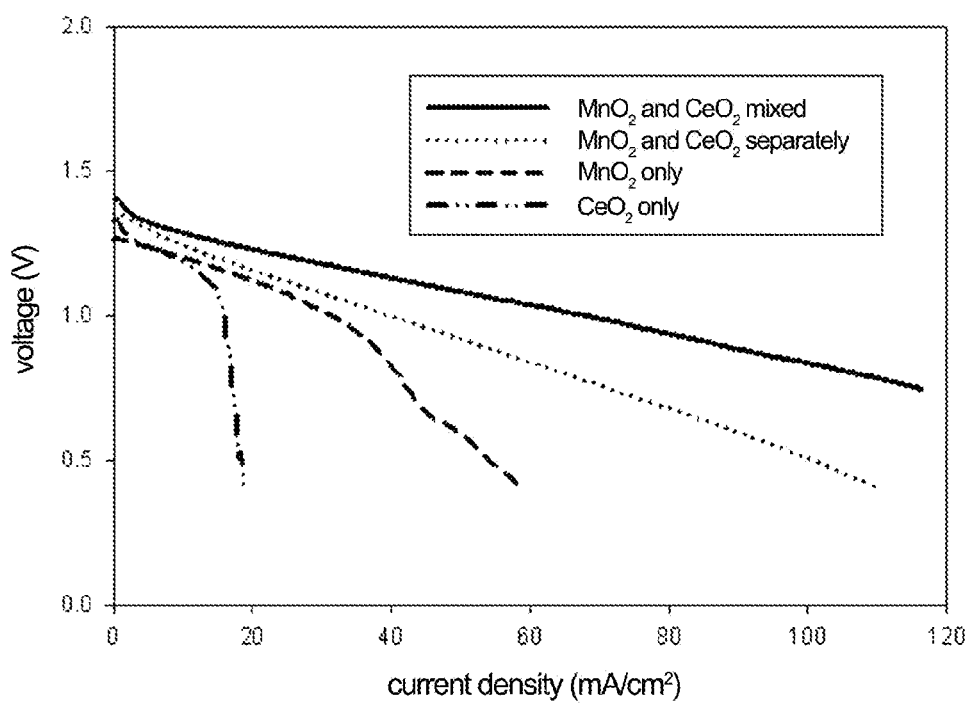
FIG. 8 is a graph illustrating a change in a performance of the zinc air fuel cell according to the type of catalyst material and manufacturing conditions.

As shown in FIG. 8, when four catalyst layers were formed on a carbon paper by using a single catalyst component such as $MnO_2$ or $CeO_2$, individual catalyst materials showed low activities for the oxygen reduction reaction, because as the current density increased, the voltage generated abruptly became lower. When an ink containing $MnO_2$ and an ink containing $CeO_2$ were alternately applied on the carbon paper two times (i.e. four layers), the catalyst-layer-coated carbon paper resulted in the enhancement of cell performance plausibly because of a spiral effect of reciprocal reaction activities. In contrast, when a mixture of $MnO_2$ and $CeO_2$ was applied on a carbon paper four times, the catalyst-layer-coated carbon paper with a multilayer structure resulted in further enhancement of the fuel cell performance because the voltage generated was higher than others and gradually decreased.

Experimental Example 1

Changes in Performance According to the Structure of Zinc Air Fuel Cell

Performances of zinc air fuel cells in Example 1, Example 2, and Comparative Example 1 according to the present invention were analyzed. The results of cell performance were shown in FIG. 9.

Figure 9A:
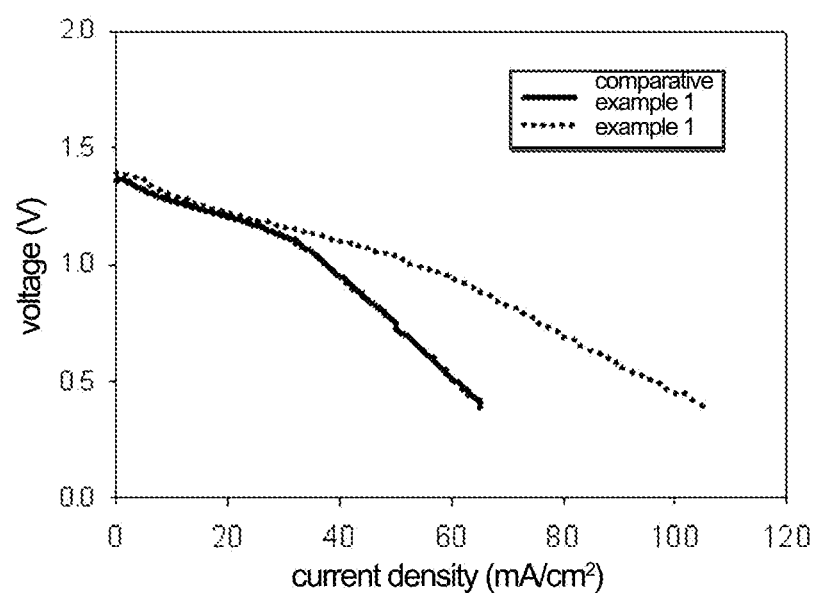
FIG. 9A is a graph illustrating a change generation a voltage according to the variation of current density of the zinc air fuel cell as Examples 1 and 2 according to the present invention and Comparative Example 1.

As shown in FIG. 9A, based on a unit area of cathode current collector (or a unit area of active catalyst layer), while a voltage which was generated from the fuel cell was gradually decreasing until the current density of the Example 1 and Comparative Example 1 reached about 35 $mA/cm^2$, a voltage from the fuel cell in Comparative Example 1 was sharply decreasing as the current density increased by 35 $mA/cm^2$ or more, and the voltage from the fuel cell became 0.4 V when the current density reached 65 $mA/cm^2$. However, in Example 1, a decrease in voltage gradually proceeded as the current density decreased and the voltage became 0.4 V as the current density reached 110 $mA/cm^2$. Thus, the zinc air fuel cell with the separator-electrode assembly according to the present invention shows enhanced performance.

Figure 9B:
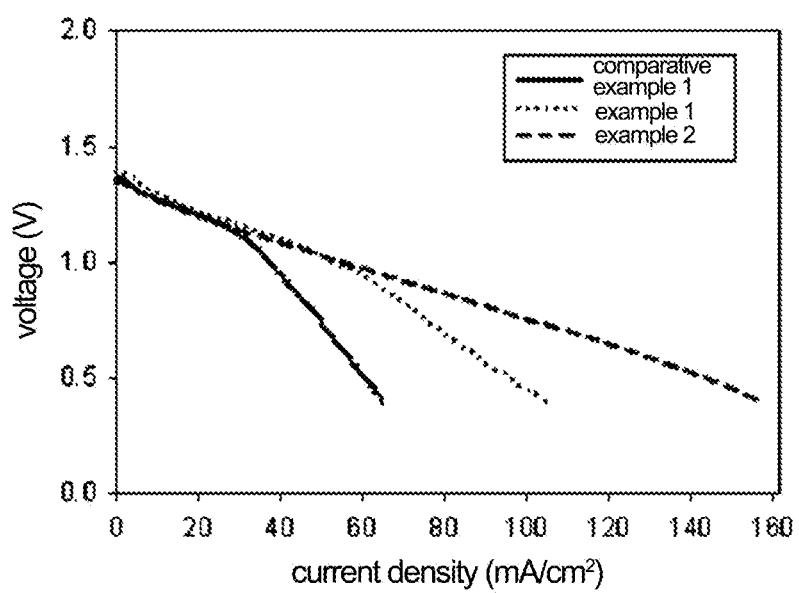
FIG. 9B is a graph illustrating a change in generation of voltage according to the variation of current density of the zinc air fuel cell as Examples 1 and 2 according to the present invention and Comparative Example 1.

Furthermore, as shown in FIG. 9B, in the Example 2 where the area of an anode current collector was increased by adding a metal sheet on the nonconductive support, the performance of the fuel cell was further enhanced, because as the current density increased, the voltage from the fuel cell decreased the most stably and gradually. Thus, if the moving distance of hydroxyl ions (OH$^-$), which is generated around the cathode current collector, to the anode current collector is minimized, and the contact area between zinc pellets and the anode current collector is increased, and resultantly the ionization of zinc is accelerated, the performance of the fuel cell may be enhanced.

As described above, for the zinc air fuel cell according to the present invention, a manufacturing cost may be reduced by using a mixture of $MnO_2$ and $CeO_2$, which are low-priced metal oxides as catalyst materials for oxygen reduction, and by using a low-priced NYLON™ (a generic designation for a family of polyamides trademarked by DuPont) filter, which has a micro-porous structure and shows high stability in aqueous alkaline electrolyte. Furthermore, the performance of the zinc air fuel cell may be efficiently enhanced by using a separator-electrode assembly structure, which minimize a distance between the anode current collector and the cathode current collector, and by adding a metal plate which plays a role of additional anode current collector on the tilted nonconductive support so as to increase the anode current collector's area contacting with zinc pellets and resultantly enhance the ionization of zinc.

Although the preferred embodiments of the present invention have been disclosed for illustrative purposes, those skills in the art will appreciate that various modifications, additions and substitutions are possible, without departing from the scope and spirit of the invention as disclosed in the accompanying claims.

What is claimed is:

1. A zinc air fuel cell system comprising:
    a zinc air fuel cell comprising:
        an integrated separator-electrode assembly comprising:
            a perforated cathode,
            a catalyst-coated carbon paper,
            a separator, and
            a perforated anode;
        a tilted nonconductive support;
        a metal sheet on the tilted nonconductive support in which the metal sheet is electrically connected to the perforated anode;
        a tapered electrolyte chamber between the perforated anode and the metal sheet on the tilted nonconductive support;
    an electrolyte within the tapered electrolyte chamber and in fluid contacts with the metal sheet, the perforated anode, the separator, and the catalyst-coated carbon paper;
    zinc pellets in a portion of the electrolyte between the metal sheet on the tilted nonconductive support and the separator of the integrated separator-electrode assembly;
    a tank connected to the tapered electrolyte chamber, wherein the tank is configured to eliminate sedimentation that comprises zinc oxide powder and zinc particles from the electrolyte;
    a pump connected to the tank; and
    a zinc pellet reservoir connected to the flow into the tapered electrolyte chamber.

2. The zinc air fuel cell system of claim 1, wherein the perforated cathode and the perforated anode comprise one of stainless steel, nickel, iron, copper, gold and platinum.

3. The zinc air fuel cell system of claim 1, wherein the perforated cathode and the perforated anode are stainless steel or nickel.

4. The zinc air fuel cell system of claim 1, wherein the catalyst-coated carbon paper is manufactured by mixing amorphous carbon, a catalyst mixture of $MnO_2$ and $CeO_2$, and a binder, spraying the resultant mixture on a carbon paper, and drying the carbon paper.

5. The zinc air fuel cell system of claim 1, wherein the catalyst-coated carbon paper has a multilayered structure of catalyst layers prepared by:
    mixing amorphous carbon, a catalyst mixture of $MnO_2$ and $CeO_2$, and a binder;
    diluting the resultant mixture with water and alcohol;
    spraying the diluted mixture on a carbon paper;
    drying the carbon paper; and
    repeating the spraying and the drying multiple times.

6. The zinc air fuel cell system of claim 1, wherein the separator comprises a net filter.

7. The zinc air fuel cell system of claim 1, wherein zinc particles which are smaller than a lower end aperture of the between the separator-electrode assembly and the tilted nonconductive support flow outward of the tapered electrolyte chamber.

8. The zinc air fuel cell system of claim 1, wherein the tilted nonconductive support comprises one of acrylonitrile-styrene copolymer (AS resin), acrylonitrile-butadiene-styrene copolymer (ABS resin), polystyrene (PS resin), polypropylene 5 (PP resin), high-density polyethylene (HDPE resin) and polyimide.

9. The zinc air fuel cell system of claim 1, wherein the tilted nonconductive support has a tilt angle ranging from 2° to 4° with respect to the separator-electrode assembly.

10. The zinc air fuel cell system of claim 1, wherein a metal sheet is placed on the tilted nonconductive support in order to function as an extra anode in the integrated separator-electrode assembly.

11. The zinc air fuel cell system of claim 10, wherein the metal sheet comprises one of stainless steel, nickel, iron, copper, gold and platinum.

12. The zinc air fuel cell system of claim 10, wherein a performance of a zinc air fuel cell is enhanced by connecting the metal sheet comprises one of stainless steel and nickel.

13. A zinc air fuel cell system comprising:
    an integrated separator-electrode assembly comprising:
        a perforated cathode,
        a catalyst-coated carbon paper,
        a net filter separator, and
        a perforated anode;
    a tilted nonconductive support having a tilt angle ranging from 2° to 4° with respect to the separator-electrode assembly;
    a metal sheet placed on the tilted nonconductive support and electrically connected to the perforated anode through conductive wires;
    a tapered electrolyte chamber between the perforated anode and the metal sheet placed on the tilted nonconductive support;
    an electrolyte within the tapered electrolyte chamber and in fluid contacts with the metal sheet, the perforated anode, the separator, and the catalyst-coated carbon paper;
    zinc pellets in a portion of the electrolyte between the metal sheet on the tilted nonconductive support and the separator of the integrated separator-electrode assembly;

a tank connected to the tapered electrolyte chamber, wherein the tank is configured to eliminate sedimentation that comprises zinc oxide powder and zinc particles from the electrolyte;

a pump connected to the tank; and a zinc pellet reservoir connected to the flow into the tapered electrolyte chamber.

14. The zinc air fuel cell system of claim 13, further comprising:

an air inlet connected and an air outlet connected to apart the perforated cathode side of the integrated separator-electrode assembly.

15. The zinc air fuel cell system of claim 14, further comprising:

a compressed air cylinder connected to the air inlet; and a fume hood connected to the air vent outlet.

16. The zinc air fuel cell system of claim 1, further comprising:

an air inlet connected and an air outlet connected apart to the perforated cathode side of the integrated separator-electrode assembly.

17. The zinc air fuel cell system of claim 1, further comprising:

a compressed air cylinder connected to an air inlet; and a fume hood connected to an air vent outlet.

* * * * *